United States Patent [19]
Murkett et al.

[11] Patent Number: 5,678,884
[45] Date of Patent: Oct. 21, 1997

[54] AIR GUIDE DEVICE WITH AIR INTAKE OPENINGS

[75] Inventors: Stephen Murkett, Gerlingen; Michael Preiss; Norbert Singer, both of Vaihingen; Herbert Ampferer, Sachsenheim, all of Germany

[73] Assignee: Dr. Ing. h.c.F. Porsche AG, Weissach, Germany

[21] Appl. No.: 557,775

[22] Filed: Nov. 13, 1995

[30] Foreign Application Priority Data

Nov. 11, 1994 [DE] Germany .............. 44 41 592.3

[51] Int. Cl.$^6$ .................................................. B62D 35/00
[52] U.S. Cl. .................... 296/180.1; 180/68.1; 180/903
[58] Field of Search ................ 296/180.1, 180.2, 296/180.3, 180.4, 180.5, 91; 180/903, 68.3, 68.1

[56] References Cited

U.S. PATENT DOCUMENTS

| | | | |
|---|---|---|---|
| 4,558,898 | 12/1985 | Deaver | 296/180.1 |
| 4,688,840 | 8/1987 | Kretschmer | 296/180.1 |
| 5,340,190 | 8/1994 | Engel | 296/180.1 |

FOREIGN PATENT DOCUMENTS

| | | | |
|---|---|---|---|
| 0 199 010 | 10/1986 | European Pat. Off. | |
| 35 38 253 | 4/1987 | Germany | |
| 88 01 032.5 | 4/1988 | Germany | |
| 41 02 559 | 7/1992 | Germany | |

OTHER PUBLICATIONS

Motor Trend Import Car Buying Guide '85, v36, p. 53(10) Dec. 1984.

The 911 idea, Germany 1995, Chapter–"Models", The sporting idea, Aug. 1995.

Japanese Abstract No. JP–4078777, vol. 16, No. 293 (M–1273), Jun. 29, 1992.

La Réussite Porsche by Barth et al., Paris 1981, Chapter—"Type Carrera RSR–Turbo", p. 551 and Chapter 935–1976, p. 562.

*Primary Examiner*—David M. Mitchell
*Assistant Examiner*—Kia M. Robinson
*Attorney, Agent, or Firm*—Evenson, McKeown, Edwards & Lenahan, P.L.L.C.

[57] ABSTRACT

An air guide device on the rear of a motor vehicle has an airfoil located between side elements. The device includes a spoiler unit located at a distance from the airfoil with an integrated air intake grille in a trunk lid. The spoiler unit is made in one piece with the side elements to hold the airfoil which runs crosswise. Intake openings for supplying engine air are located in each of the side elements.

19 Claims, 6 Drawing Sheets

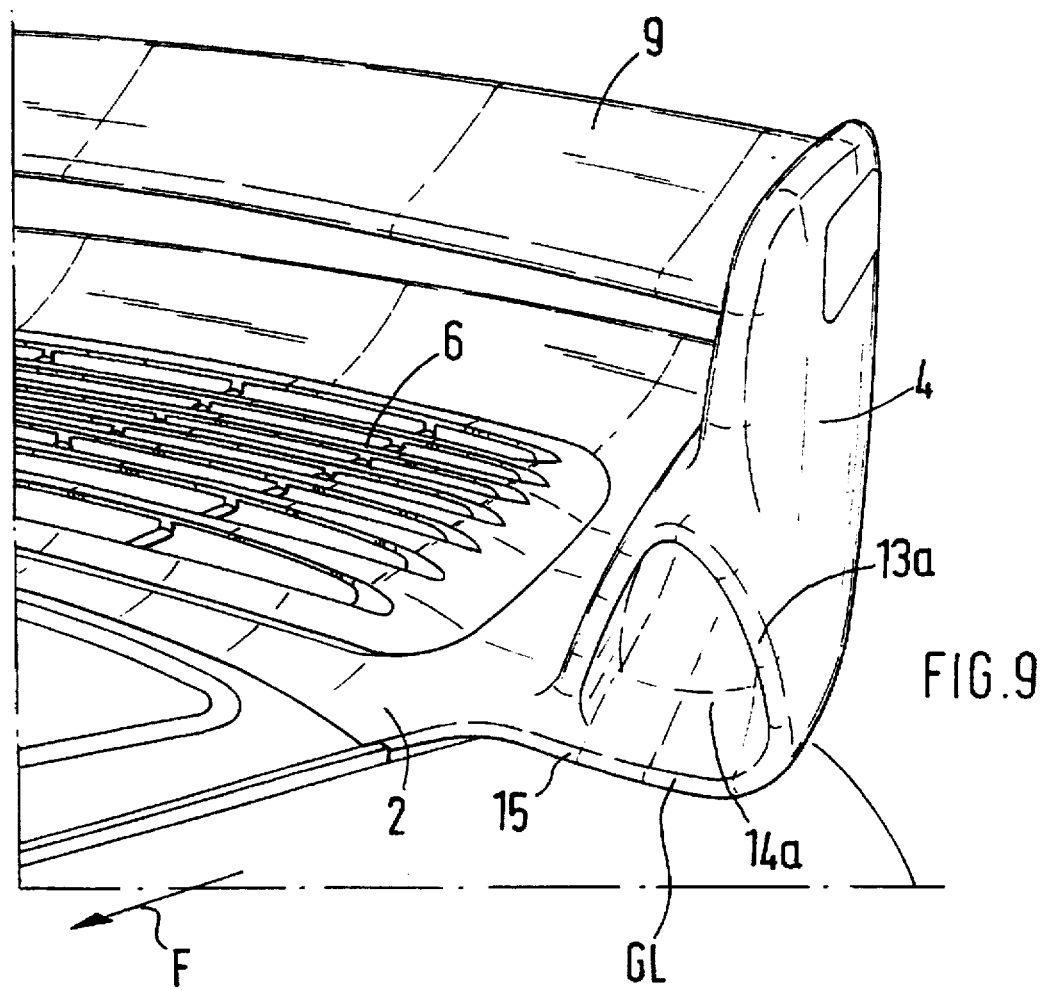

AIR GUIDE DEVICE WITH AIR INTAKE OPENINGS

BACKGROUND AND SUMMARY OF THE INVENTION

The invention relates to an air guide device and, more particularly, to an air guide device on the rear of a motor vehicle with an airfoil located between sides thereof.

German Patent document DE-41 02 559 A1 describes an airfoil arrangement for improving the ground adhesion of a motor vehicle. The airfoil is mounted transversely on the top of the rear of the vehicle and is operated upon by the wind blast in such manner that a downward force is produced. The airfoil has an outwardly convex surface facing the rear of the vehicle. In addition, U.S. Pat. No. 4,558,898 teaches an airfoil with sides. The airfoil is supported between supports on a trunk lid of a motor vehicle.

There is therefore needed an improved air guide device for a motor vehicle which, in addition to a downward force, ensures optimum air guidance to the engine as well as a simple installation.

These needs are met according to the invention by an air guide device on the rear of a motor vehicle with an airfoil located between sides thereof. The device includes a spoiler unit located at a distance from the airfoil with an integrated air intake grille in a trunk lid. The spoiler unit is made in one piece with sides to hold the airfoil. Intake openings are provided in each of the sides to admit air to the engine.

The primary advantages achieved with the present invention consist in that the air guide device is removably integrated assemblywise into a trunk lid, resulting in a preassembled module composed of the hood and air guide device. The air guide device is formed by an airfoil arranged transversely with respect to the vehicle as well as a spoiler which, together with sides, forms a one-piece module and is fitted into an opening in the trunk lid and fastened in place by screw fasteners. At the same time, air inlet openings in an intake grille are located in the basic body of the spoiler.

In preferred embodiments, the sides of the air guide device constitute air guide elements and each have intake openings on the inside that allow accumulated air to be fed to the engine. For this purpose, the sides are located approximately at the centers of the fenders and with a lateral spacing from the vehicle body above the belt line so that even the air stream flowing past the vehicle on the sides will be guided by the air guide device.

In further preferred embodiments, between the sides of the air guide, the airfoil assumes a basic position and a position in which it is at an angle. This is so that different downward forces can be generated. In particular, a downward force is produced even when the vehicle is traveling slowly.

In order for the air guide device, especially by virtue of the airfoil in conjunction with the spoiler, to produce an optimum air guidance with correspondingly acting downward force of the wind even at low speeds, the airfoil is made in the form of a supporting surface profile as in an aircraft. When viewed from above, the airfoil is made in the form of a section of a circle. In addition, the airfoil, as viewed from above, is made arcuate.

In certain preferred embodiments, the sides, as seen in the side view, are approximately wedge-shaped like the point of an arrow and have a plurality of sections that together produce an irregular pentagon.

The intake openings in each side are made either funnel-shaped with an elongated mouth opening or triangular in shape, with this triangular mouth opening being made directly without a funnel-shaped intake channel.

Other objects, advantages and novel features of the present invention will become apparent from the following detailed description of the invention when considered in conjunction with the accompanying drawings.

BRIEF DESCRIPTION OF THE DRAWINGS

FIG. 9 is another embodiment of an air intake opening in the side of the air guide device.

DETAILED DESCRIPTION OF THE DRAWINGS

Figure 1:
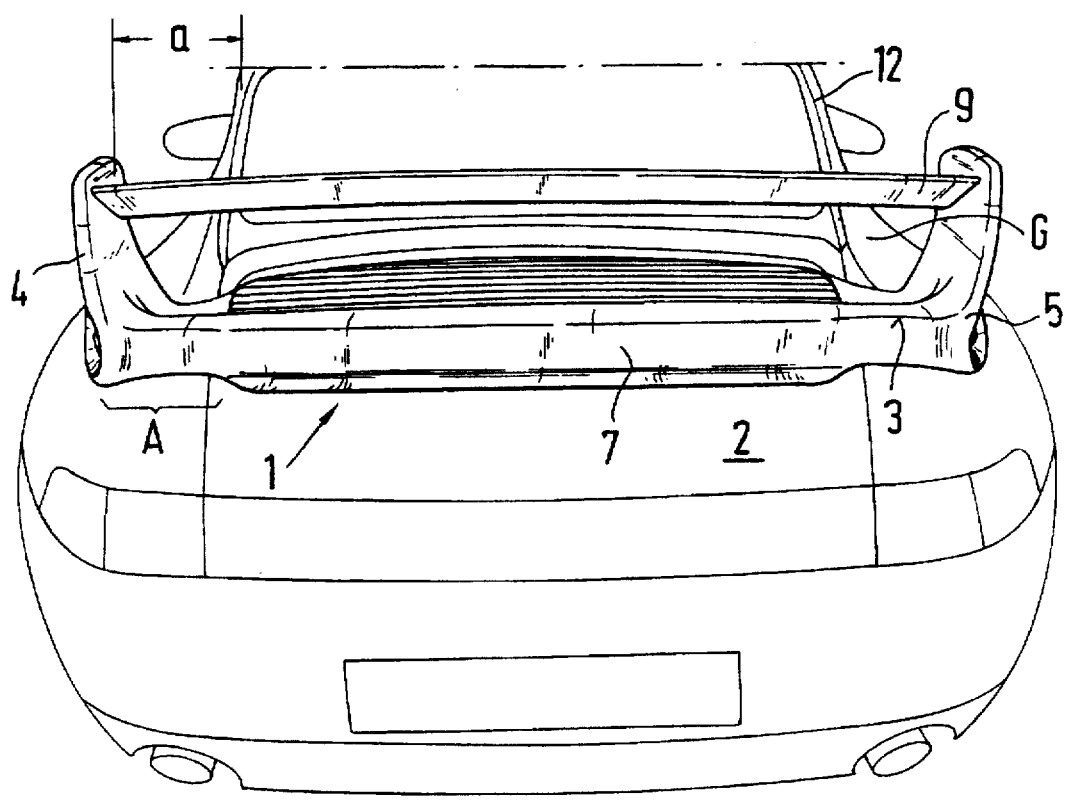
FIG. 1 as a rear view of the air guide device according to the invention.
Figure 8:
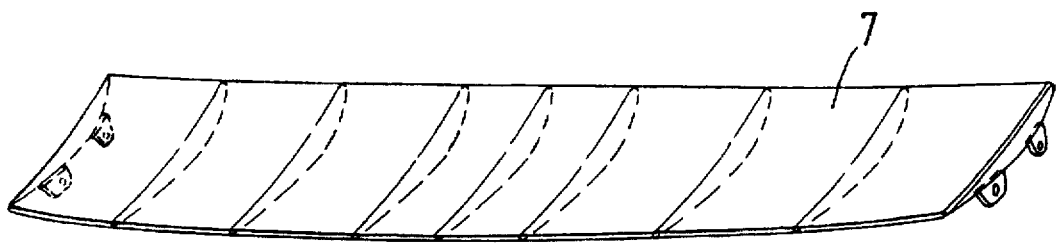
FIG. 8 is a schematic diagram of the airfoil with supporting surface profile.

Referring to FIG. 1, an air guide device 1 essentially includes a spoiler unit 3 inserted in a trunk lid 2 with integrated sides 4, 5 and a ventilation grille 6. The spoiler unit 3 consists of a spoiler 7 with an elevated end edge 8 (FIG. 6) and molded sides 4 and 5. Above the spoiler 7 at a vertical distance therefrom, an airfoil 9 is mounted between the sides 4, 5 and is in the shape of a supporting surface profile (FIG. 8) as in an aircraft. The direction of travel of the vehicle is indicated by arrow F in the figures.

Figure 2:
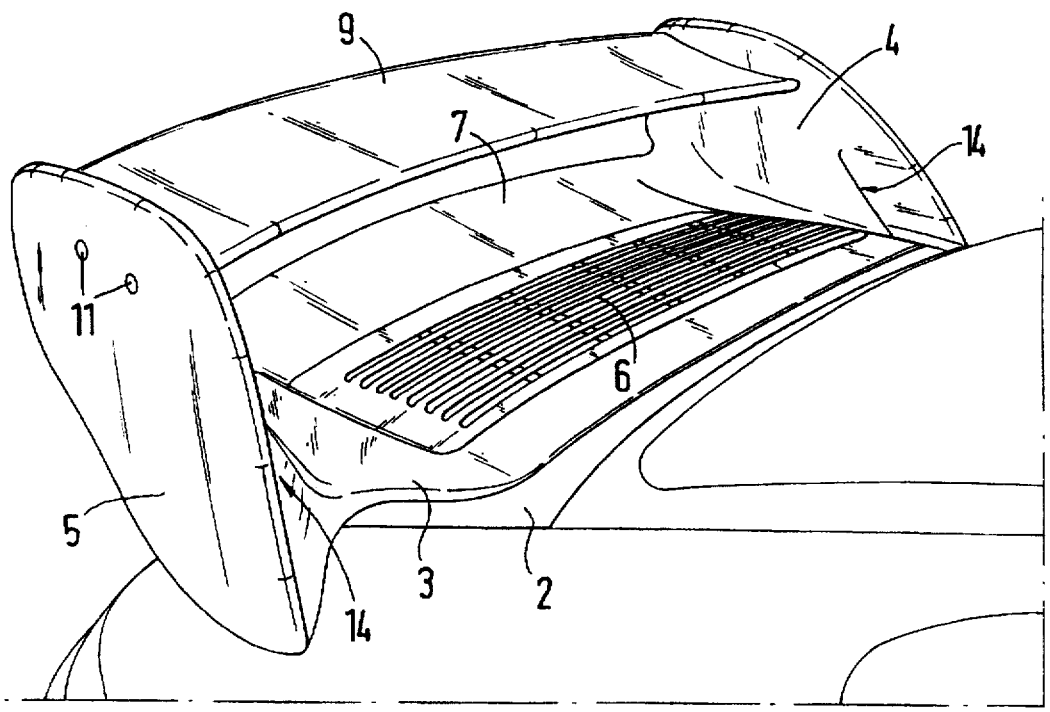
FIG. 2 is a perspective view of the air guide device.
Figure 3:
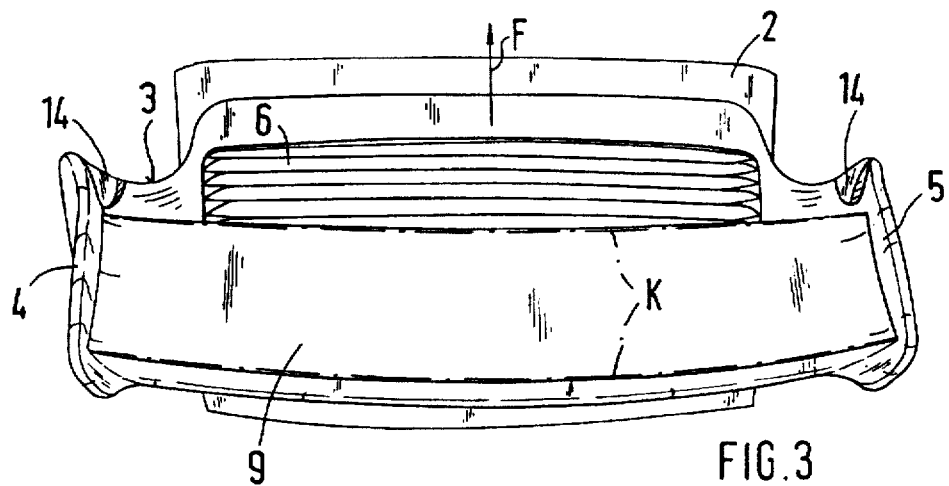
FIG. 3 is a top view of the air guide device.

The airfoil 9 has its highly positively convex surface 20 (FIG. 6) facing the spoiler 7 and is attached by screws 11 (FIG. 2) to side elements 4, 5. The airfoil 9 can be locked on the side elements 4, 5 in at least two positions, a basic position I and an adjusted position II (FIG. 7). The adjusted position II is inclined relative to the basic position by an angle alpha=10°. The airfoil 9, as viewed from above, forms a section of a circle K as indicated by the dot-dashed lines in FIG. 3. Viewed from the front, the airfoil 9 is arcuate with a slight upward curvature. The airfoil 9 runs approximately parallel to the spoiler 7. The spoiler 7 extends up to the centers of the vehicle fenders so that a space "a" is left between the sides 12 of the vehicle above a belt line GL and the side elements 4, 5 as shown in FIG. 1. Above the fenders, the spoiler 7 has an exposed section "A".

Figure 5:
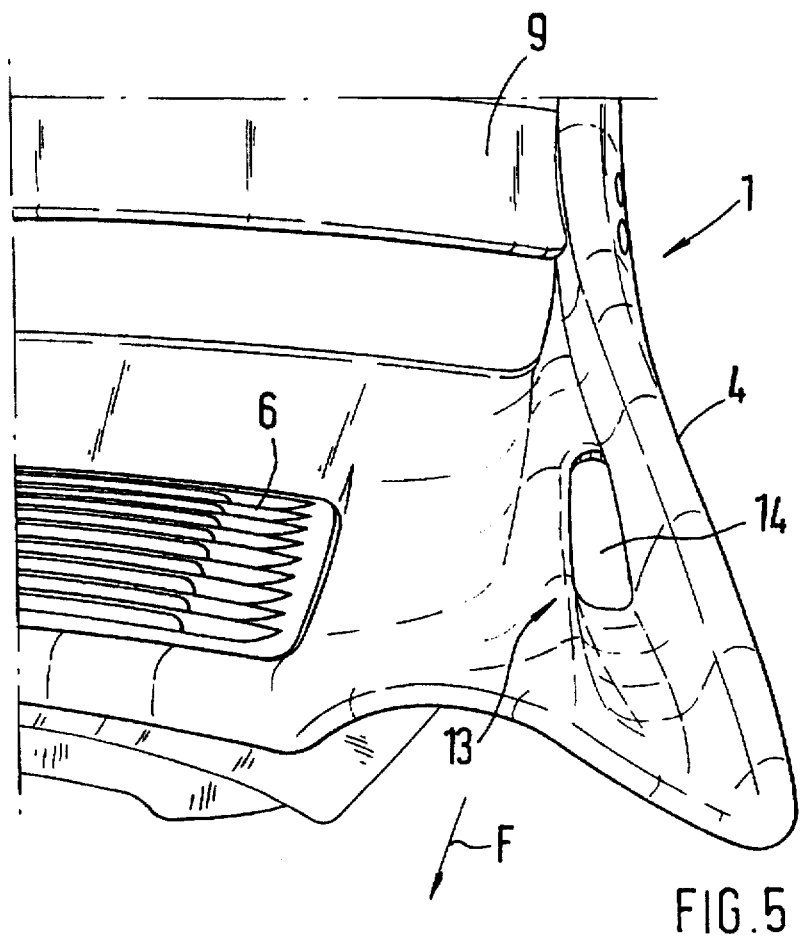
FIG. 5 is a top view of an air intake opening on the side of the air guide device.

An air intake channel 13, 13a having an intake opening 14, 14a is provided in each of the side elements 4, 5. The air inlet channel 13 according to FIG. 5 has a funnel shape provided in an ear-shaped molding on the side elements 4, 5. According to another embodiment shown in FIG. 9, the intake opening 14a is formed at an end on the elements 4, 5. The intake opening 14a ends approximately at the leading edge 15 of the trunk lid 2.

Figure 4:
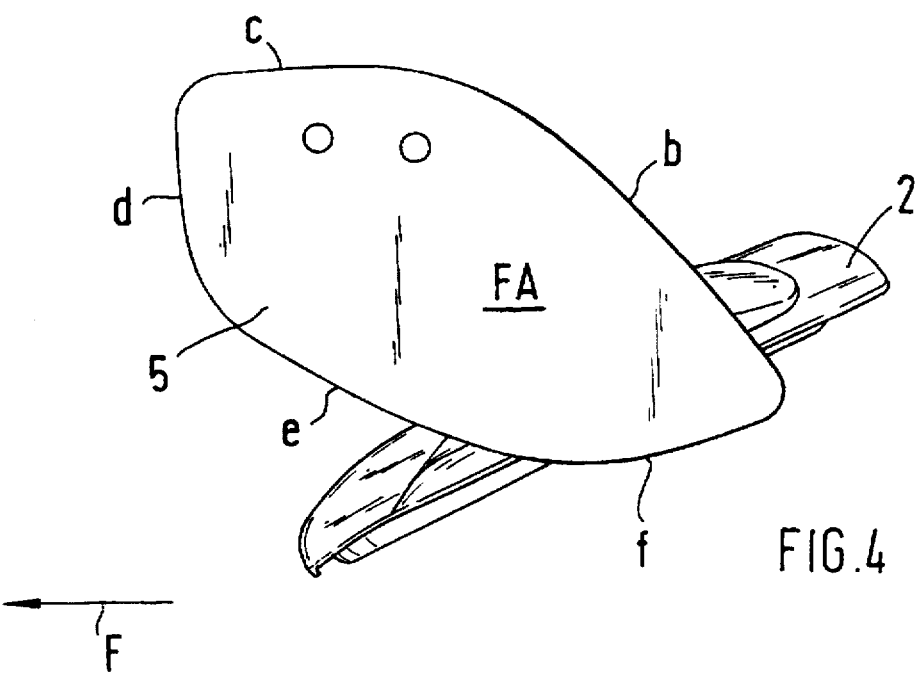
FIG. 4 is a side view of one side of the air guide device.

The side elements 4 and 5, as seen in the side view of FIG. 4, are approximately wedge-shaped having a plurality of sections b to f which together produce an irregular pentagonal element. Sections c and f run approximately parallel to one another. Section c is located at an approximately right angle with respect to section d.

Figure 6:
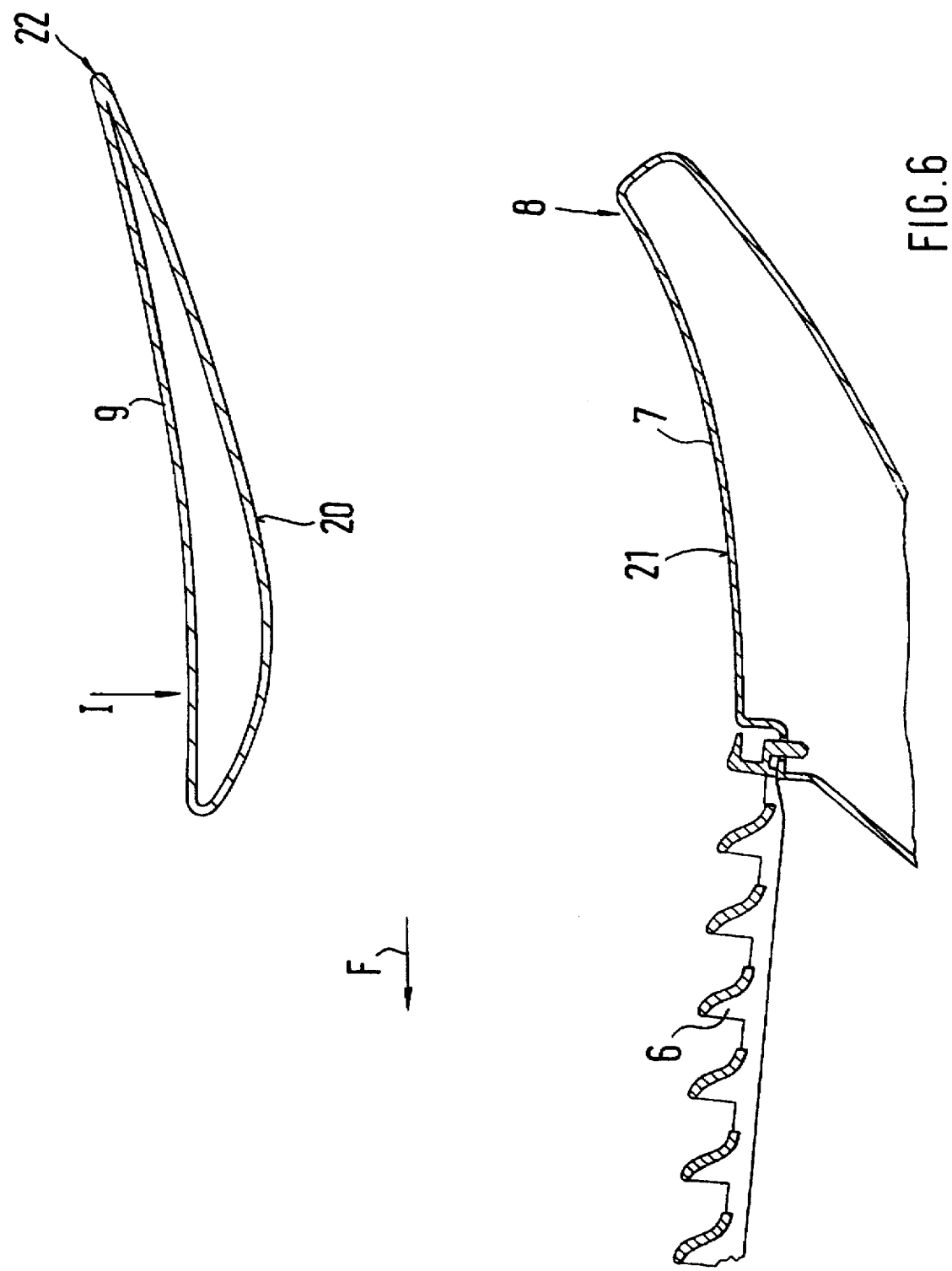
FIG. 6 is a central section view through the air guide device with the airfoil, spoiler, and air intake grille.
Figure 7:
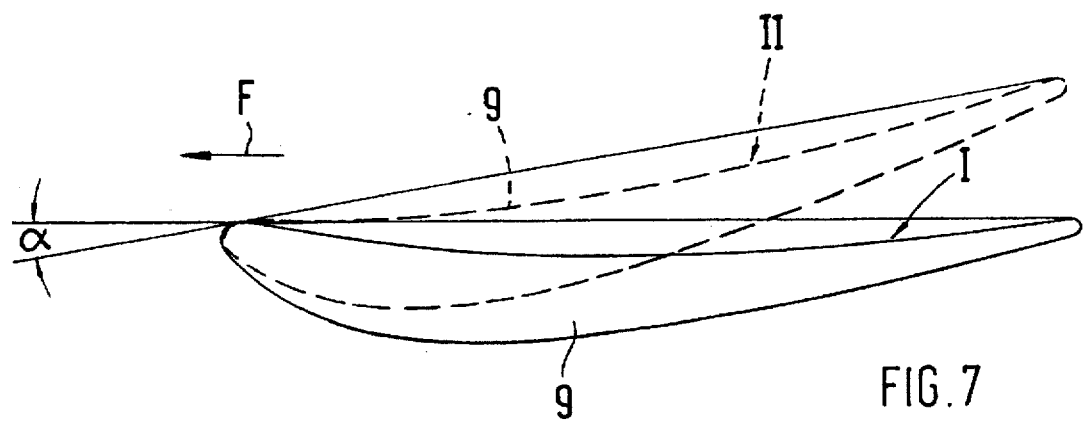
FIG. 7 is a side view of the airfoil in a basic position and in an adjusted position as indicated by the dashed lines.

As FIG. 6 shows in greater detail, the positive surface 20 of the airfoil 9 rotated through 180° corresponds approximately in shape to the negative surface 21 of the spoiler 7, so that surfaces 21 and 22 are approximately parallel to one another. The spoiler 7 has a negative surface 21 that ends in front of the free end 22 of the airfoil 9.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An air guide device on a rear of a motor vehicle having an airfoil located between side elements of the air guide device, comprising:

a spoiler unit arranged at a distance from the airfoil, said spoiler unit being integrated with an air intake grille in a trunk lid of the motor vehicle;

wherein said spoiler unit is formed in one piece with said side elements which hold the airfoil;

intake openings provided in each of said side elements to admit air to an engine of the motor vehicle; and wherein each intake opening has a funnel-shaped air intake channel provided in an ear-shaped molding on the side elements.

2. An air guide device according to claim 1, further comprising:

fasteners for securing the airfoil to the side elements in at least two fixed positions;

wherein a first adjusted position of said airfoil is at an angle of at least 10° with respect to a basic position of the airfoil.

3. An air guide device according to claim 1, wherein said airfoil, when viewed from above, forms a section of a circle and, when viewed from the front, has an arcuate shape.

4. An air guide device according to claim 1, wherein said spoiler unit includes a spoiler provided on the trunk lid running approximately parallel to the airfoil;

wherein said spoiler includes exposed sections which extend to fenders of the motor vehicle; and wherein said side elements are arranged on each side of said spoiler at a distance from side surfaces running above a belt line of the motor vehicle.

5. An air guide device on a rear of a motor vehicle having an airfoil located between side elements of the air guide device, comprising:

a spoiler unit arranged at a distance from the airfoil, said spoiler unit being integrated with an air intake grille in a trunk lid of the motor vehicle;

wherein said spoiler unit is formed in one piece with said side elements which hold the airfoil;

intake openings to admit air to an engine of the motor vehicle, said intake openings being integrated in each of said side elements between interior and exterior substantially-planar surfaces of said side elements;

wherein said side elements each have an air intake channel for the intake opening; and wherein each intake opening has a funnel-shaped air intake channel provided in an ear-shaped molding on the side elements.

6. An air guide device on a rear of a motor vehicle having an airfoil located between side elements of the air guide device, comprising:

a spoiler unit arranged at a distance from the airfoil, said spoiler unit being integrated with an air intake grille in a trunk lid of the motor vehicle;

wherein said spoiler unit is formed in one piece with said side elements which hold the airfoil;

intake openings provided in each of said side elements to admit air to an engine of the motor vehicle; and wherein an air intake channel formed in each side element has a triangular mouth opening abutting a leading edge of either the associated side element or the trunk lid.

7. An air guide device according to claim 6, wherein a base line of the triangular mouth opening is formed by a section of the leading edge of the trunk lid.

8. An air guide device according to claim 1, wherein said side elements, when viewed from the side, have an approximately wedge-shaped surface with a plurality of peripheral sections constituting an irregular polygon, one of said plurality of peripheral sections which faces the trunk lid running approximately parallel to another of said plurality of peripheral sections which is adjacent to the airfoil.

9. An air guide device according to claim 1, wherein the airfoil is formed as a supporting surface profile having an outwardly positively curved surface facing the spoiler;

wherein said spoiler has a raised end section and an approximately negative shaped surface profile corresponding to the outwardly positively curved surface of the airfoil.

10. An air guide device according to claim 6, further comprising:

fasteners for securing the airfoil to the side elements in at least two fixed positions;

wherein a first adjusted position of said airfoil is at an angle of at least 10° with respect to a basic position of the airfoil.

11. An air guide device according to claim 6, wherein said airfoil, when viewed from above, forms a section of a circle and, when viewed from the front, has an arcuate shape.

12. An air guide device according to claim 6, wherein said spoiler unit includes a spoiler provided on the trunk lid running approximately parallel to the airfoil;

wherein said spoiler includes exposed sections which extend to fenders of the motor vehicle; and wherein said side elements are arranged on each side of said spoiler at a distance from side surfaces running above a belt line of the motor vehicle.

13. An air guide device according to claim 6, wherein said side elements, when viewed from the side, have an approximately wedge-shaped surface with a plurality of peripheral sections constituting an irregular polygon, one of said plurality of peripheral sections which faces the trunk lid running approximately parallel to another of said plurality of peripheral sections which is adjacent to the airfoil.

14. An air guide device according to claim 6, wherein the airfoil is formed as a supporting surface profile having an outwardly positively curved surface facing the spoiler;

wherein said spoiler has a raised end section and an approximately negative shaped surface profile corresponding to the outwardly positively curved surface of the airfoil.

15. An air guide device according to claim 5, further comprising:

fasteners for securing the airfoil to the side elements in at least two fixed positions;

wherein a first adjusted position of said airfoil is at an angle of at least 10° with respect to a basic position of the airfoil.

16. An air guide device according to claim 5, wherein said airfoil, when viewed from above, forms a section of a circle and, when viewed from the front, has an arcuate shape.

17. An air guide device according to claim 5, wherein said spoiler unit includes a spoiler provided on the trunk lid running approximately parallel to the airfoil;

wherein said spoiler includes exposed sections which extend to fenders of the motor vehicle; and wherein said side elements are arranged on each side of said spoiler at a distance from side surfaces running above a belt line of the motor vehicle.

18. An air guide device according to claim 5, wherein said side elements, when viewed from the side, have an approximately wedge-shaped surface with a plurality of peripheral sections constituting an irregular polygon, one of said plurality of peripheral sections which faces the trunk lid running approximately parallel to another of said plurality of peripheral sections which is adjacent to the airfoil.

19. An air guide device according to claim 5, wherein the airfoil is formed as a supporting surface profile having an outwardly positively curved surface facing the spoiler;

wherein said spoiler has a raised end section and an approximately negative shaped surface profile corresponding to the outwardly positively curved surface of the airfoil.

* * * * *